(12) United States Patent
Bett et al.

(10) Patent No.: US 6,469,097 B1
(45) Date of Patent: Oct. 22, 2002

(54) AQUEOUS POLYMER DISPERSIONS BASED ON UNSATURATED HETEROCYCLIC MONOMERS AND USE IN CROSSLINKING PROCESSES

(75) Inventors: William Bett, Paris; Vincent Granier, Nogent-sur-Marne, both of (FR); Dominique Charmot, Los Gatos, CA (US)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/674,114
(22) PCT Filed: Apr. 28, 1999
(86) PCT No.: PCT/FR99/01012
§ 371 (c)(1),
(2), (4) Date: Jan. 19, 2001
(87) PCT Pub. No.: WO99/55747
PCT Pub. Date: Nov. 4, 1999

(30) Foreign Application Priority Data

Apr. 28, 1998 (FR) .............................. 98 05318

(51) Int. Cl.$^7$ .......................... C08L 37/00; C08L 39/00
(52) U.S. Cl. ...................... 524/808; 524/501; 524/516; 524/517; 524/811
(58) Field of Search ................... 524/808, 811, 524/501, 516, 517; 525/208

(56) References Cited

U.S. PATENT DOCUMENTS

| | | | | |
|---|---|---|---|---|
| 4,349,651 A | * | 9/1982 | Smith | |
| 4,770,743 A | * | 9/1988 | Weberndoerfer et al. | |
| 5,064,923 A | * | 11/1991 | Kashihara et al. | |
| 5,120,795 A | * | 6/1992 | Filges et al. | |
| 5,430,101 A | * | 7/1995 | Minematsu et al. | |
| 5,696,212 A | * | 12/1997 | Isozaki | |

FOREIGN PATENT DOCUMENTS

| | | | |
|---|---|---|---|
| DE | 942538 | * | 5/1956 |
| DE | 3626160 | * | 2/1988 |
| DE | 19519338 | * | 11/1996 |

* cited by examiner

Primary Examiner—Tae H. Yoon

(57) ABSTRACT

The present invention relates to aqueous dispersions of water-insoluble polymers obtained from the polymerization of a mixture of monomers comprising:

at least one unsaturated heterocyclic monomer (A):
comprising at least one nucleophilic hetero atom,
containing at least one exocyclic ethylenic unsaturation, and
whose heterocycle comprises at least one ethylenic unsaturation, and optionally at least one ethylenically unsaturated functionalized monomer (B) and/or an aromatic monomer containing at least one exocyclic ethylenic unsaturation. The invention also relates to the use of these aqueous dispersions of polymers in processes for crosslinking latices obtained from the polymerization:
of a monomer containing ethylenic unsaturation (D), and
of an ethylenically unsaturated monomer containing an epoxide function (E), and/or of a polymer containing an epoxide function (EP).

32 Claims, No Drawings

AQUEOUS POLYMER DISPERSIONS BASED ON UNSATURATED HETEROCYCLIC MONOMERS AND USE IN CROSSLINKING PROCESSES

This application is an application under 35 U.S.C. Section 371 of International Application Number PCT/FR99/01012 filed on Apr. 28, 1999.

The present invention relates to aqueous dispersions of polymers obtained from the emulsion polymerization of a mixture of monomers, in which at least one of the monomers is. an unsaturated heterocycle. The invention also relates to the use of these aqueous polymer dispersions in crosslinking processes.

Coating compositions which crosslink at a temperature of above or equal to room temperature are known from the prior art. Some of these compositions result from reactions between latices separately comprising carboxylic ester functions and hydroxyl functions, or between latices comprising both hydroxyl functions and.carboxylic ester functions, particularly in the form of β-hydroxy ester.

The reactions between the hydroxyl and carboxylic ester functions can be initiated and catalysed at room temperature with catalytic systems created in situ, after reacting a nucleophile such as, for example, an imidazole with an epoxide.

However, these compositions have a certain number of drawbacks.

The main problem is the stability on storage, also known as the "pot life", of mixtures containing the abovementioned latices and the catalytic system.

Specifically, the mixtures of latex and of catalytic system of the prior art have a pot life which is much too short to make them manipulable and economically interesting: the pot life is often less than or equal to 4 hours.

In addition, the use of the catalytic systems of the prior art can pose formulation problems: the nucleophilic compound is not always easy to disperse in the reaction medium, and more particularly in aqueous medium.

Moreover, although room-temperature crosslinking processes have already been described, the crosslinking is generally efficient only at temperatures above room temperature.

It has been observed, entirely surprisingly and unexpectedly, that by modifying certain parameters of the catalytic system, in particular the starting nucleophile, it is possible to overcome the drawbacks mentioned above.

Thus, the aim of the present invention is to propose a polymer based on an unsaturated nucleophilic heterocycle which, when mixed a latex, has an improved stability on storage (pot life) and good reactivity at the time of use.

Another aim of the invention is to propose a polymer based on an unsaturated nucleophilic heterocycle which does not pose any problems of dispersion in a given reaction medium.

Finally, another aim of the invention is to propose a polymer based on an unsaturated nucelophilic heterocycle which efficiently initiates and catalyses room-temperature crosslinking processes.

To this end, a subject of the invention is an aqueous dispersion of a water-insoluble polymer (I) obtained from the emulsion polymerization of a mixture of monomers comprising:
at least one unsaturated heterocyclic monomer (A),
and optionally at least one ethylenically unsaturated monomer (B).

A subject of the invention is also a process for crosslinking a latex (II) containing an epoxide function, using the dispersion of polymer (I).

The invention thus relates firstly to an aqueous dispersion of a water-insoluble polymer (I) obtained from the emulsion polymerization in water of a mixture of monomers comprising:
at least one unsaturated heterocyclic monomer (A):
comprising at least one nucleophilic hetero atom,
containing at least one exocyclic ethylenic unsaturation, and
whose heterocycle comprises at least one ethylenic unsaturation, and
optionally at least one ethylenically unsaturated monomer (B) containing a function chosen from (meth) acrylamides, carboxylic acids or carboxylic acid salts, carboxylic esters, organosulphuric acids or organosulphuric acid salts, sulphonic acids or sulphonic acid salts, phosphonic acids or phosphonic acid salts, vinyl esters and aromatic monomers containing at least one exocyclic ethylenic unsaturation.

In the context of the present invention, the term "polymerization" means either homopolymerization (polymerization of identical monomers) or copolymerization (polymerization of different monomers).

According to an essential characteristic of the invention, the polymer (I) is in the form of an aqueous dispersion. Such aqueous polymer disperions are commonly known as latices.

The polymer (I) is obtained from the emulsion polymerization of at least one monomer. (A) This monomer (A) comprises at least one nucleophilic hetero atom. The expression "nucleophilic hetero atom" means a trivalent hetero atom belonging to group VB of the Periodic Table of the Elements. Throughout the specification, the Periodic Table is that of the "supplement to the Bulletin of the French Chemical Society, No. 1, January 1966". These hetero atoms may be nitrogen, phosphorus, arsenic, antimony or bismuth. The nucleophilic hetero atom is preferably nitrogen. The unsaturated heterocyclic monomers (A) preferably comprise at least nucleophilic hetero atoms, in particular two nitrogen atoms.

The monomer A should also contain an ethylenic unsaturation in its heterocycle and an exocyclic ethylenic unsaturation. At least one of the nucleophilic hetero atoms and/or at least one of the carbon atoms of the heterocycle may be substituted with a carbon-based chain containing at least two carbon atoms and at least one ethylenic unsaturation, it being possible for the carbon-based chain to be optionally functionalized. Substituents which may be mentioned as a guide are carbon-based chains, in particular vinyl, allyl, propenyl, butenyl and butadienyl, and functionalized carbon-based chains, in particular acrylate and methacrylate. In the monomer A, at least one of the carbon atoms of the unsaturated heterocycle can also be substituted with at least one linear or branched alkyl group containing 1 to 8 carbon atoms. In this respect, the linear or branched alkyl group can be methyl, ethyl, propyl, isopropyl or n-butyl.

The monomers (A) can belong to the imidazole, imidazoline, amidine or guanidine family. They preferably belong to the imidazole family. The monomer is more particularly N-vinylimidazole.

In the present invention, the polymer (I) can be a homopolymer obtained from the homopolymerization of a mixture composed exclusively of monomers (A), the monomers (A) being identical. The polymer (I) can also be a copolymer obtained from the copolymerization of a mixture of monomers (A) and (B).

The monomer B is ethylenically unsaturated and contains a function chosen from carboxylic acid or carboxylic acid salts, carboxylic esters, organosulphuric acids or organosulphuric acid salts, sulphonic acids or sulphonic acid salts, phosphonic acids or phosphonic acid salts, vinyl esters, (meth)acrylamides or aromatic monomers (B) containing at least one exocyclic ethylenic insaturation.

The ethylenically unsaturated monomer (B) may be chosen more particularly from:

carboxylic acids or carboxylic acid salts of the (meth) acrylic type, such as acrylic acid, methacrylic acid or sodium acrylate; dicarboxylic acids such as itaconic acid, maleic acid or fumaric acid; hemiesters thereof, such as the methyl, ethyl, propyl, n-butyl or isobutyl hemiesters; or salts thereof such as the sodium, potassium or ammonium salts thereof, carboxylic esters of the acrylic type in which the alkyl group contains from 1 to 20 carbon atoms, such as methyl acrylate, methyl methacrylate, ethyl acrylate, ethyl methacrylate, propyl acrylate, propyl methacrylate, isopropyl acrylate, n-butyl acrylate, n-butyl methacrylate, isobutyl acrylate, isobutyl methacrylate, 2-ethylhexyl acrylate, 2-ethylhexyl methacrylate, decyl acrylate, decyl methacrylate, lauryl acrylate, lauryl methacrylate, stearyl acrylate or stearyl methacrylate, organosulphuric acids or the alkali metal or alkaline-earth metal salts of organosulphuric acids, such as vinylsulphuric acid or vinylphenylsulphuric acid, sulphonic acids or the alkali metal or alkaline-earth metal salts of sulphonic acids, for example vinylsulphonic acids such as vinylsulphonic acid, styrenesulphonic acid, 2-acrylamido-2-methylpropanesulphonic acid or sodium methallyl sulphonate, phosphonic acids or the alkali metal or alkaline-earth metal salts of phosphonic acids, for example vinylphosphonic acid, vinyl esters in which the portion comprising the ester function contains 1 to 7 carbon atoms, such as vinyl acetate, vinyl Versatate® or vinyl propionate, (meth)acrylamides and derivatives thereof in which the alkyl group contains from 1 to 10 carbon atoms, such as acrylamide and methacrylamide, and aromatic monomers containing at least one exocyclic ethylenic unsaturation and containing 8 to 18 carbon atoms, such as styrene, vinyltoluene or α-methylstyrene.

The ethylenically unsaturated monomer (B) is preferably chosen from carboxylic esters of the (meth)acrylic type, in which the alkyl group contains from 1 to 20 carbon atoms, such as methyl acrylate, methyl methacrylate, ethyl acrylate, ethyl methacrylate, propyl acrylate, propyl methacrylate, isopropyl acrylate, n-butyl acrylate, n-butyl methacrylate, isobutyl acrylate, isobutyl methacrylate, 2-ethylhexyl acrylate, 2-ethylhexyl methacrylate, decyl acrylate, decyl methacrylate, lauryl acrylate, lauryl methacrylate, stearyl acrylate or stearyl methacrylate.

According to one preferred embodiment, the mixture of monomer(s) (B) comprises few or no (meth)acrylamides and/or carboxylic acids, since these monomers have the property of making the polymer (I) water-soluble. Thus, the amount of (meth)acrylamides or of carboxylic acids used should preferably be fairly small so as to avoid making the polymer (I) soluble.

According to the preferred embodiment, the aqueous dispersion of polymer (I) is obtained from the copolymerization of a mixture of monomers comprising:

N-vinylimidazole as monomer (A), and methyl methacrylate and/or n-butyl acrylate as monomer (B).

The content of monomer(s) (A) is generally between 1% and 100% by weight, preferably between 1% and 20% by weight and more particularly between 1% and 6% by weight, relative to the total weight of the polymer (I).

If monomers (B) are used to synthesise the polymer (I), the content of monomer(s) (B) is generally between 1% and 99% by weight, preferably between 80% and 99% by weight and more particularly between 94% and 99% by weight, relative to the total weight of the polymer (I).

The polymer (I) can be made more reactive by adding a third type of monomer to the polymerization mixture. The reason for this is that the polymer (I) can be obtained from the copolymerization of a mixture of monomers. (A), (B) and of at least one. hydroxycarboxylic ester (C) chosen from acrylic and methacrylic esters in which the hydroxyalkyl group contains from 2 to 10 carbon atoms. The carboxylic esters (C) can be chosen from 2-hydroxyethyl acrylate, 2-hydroxyethyl methacrylate, 3-hydroxypropyl acrylate, 3-hydroxypropyl methacrylate, 4-hydroxybutyl acrylate and 4-hydroxybutyl methacrylate. The content of monomer(s) (C) is generally between 1% and 40% by weight and preferably between 1% and 30% by weight relative to the total weight of the polymer (I).

The aqueous dispersion of polymer (I) according to the invention is obtained by simple mixing of monomers (A), optionally (B) and/or (C), followed by emulsion polymerization in water. It is important for the emulsion to be prepared in water since the use of solvents generally results in precipitation of the polymer (I); the polymer (I) is thus not in the form of latex. The monomers used can be introduced as a mixture or separately and simultaneously into the reaction medium, either before the start of the polymerization in a single portion, or during the polymerization in successive fractions or continuously. It is generally preferable for the emulsion polymerization to be carried out at a pH of at least 7, or even of at least 8. Consequently, the pH of the aqueous dispersion of polymer. (I) according to the invention preferably has a pH of at least 7, or even of at least 8. The polymerization is usually carried out in the presence of an emulsifier and a polymerization initiator. Emulsifiers which can generally be used are the conventional anionic agents represented in particular by fatty acid salts, alkyl sulphates, alkyl sulphonates, alkylaryl sulphates, alkylaryl sulphonates, aryl sulphates, aryl sulphonates, sulphosuccinates and alkyl phosphates of alkali metals, and hydrogenated or non-hydrogenated abietic acid salts. They are generally used in a proportion of from 0.01% to 5% by weight relative to the total weight of the monomers. The emulsion-polymerization initiator is represented more particularly by hydroperoxides such as aqueous hydrogen peroxide solution, cumene hydroperoxide, diisopropylbenzene hydroperoxide, paramenthane hydroperoxide and tert-butyl hydroperoxide, and by persulphates such as sodium persulphate, potassium persulphate and ammonium persulphate. It is used in an amount of between 0.05% and 2% by weight relative to the total weight of the monomers. These initiators are optionally combined with a reducing agent, such as sodium bisulphite or sodium formaldehydesulphoxylate, polyethyleneamines, sugars (dextrose, sucrose) and metal salts. The amount of reducing agent used ranges from 0% to 3% by weight relative to the total weight of the monomers. The reaction temperature, which depends on the initiator used, is generally between 0°C. and 100° C. and preferably between 30° C. and 90° C. A transfer agent can be used, in proportions ranging from 0% to 3% by weight relative to the monomer(s) and is generally chosen from mercaptans such as N-dodecyl mercaptan and tert-dodecyl mercaptan, cyclohexene and halogenated hydrocarbons such as chloroform, bromoform or carbon tetrachloride. This transfer agent allows the length of the molecular chains to be controlled. It is added to the reaction medium either before the polymerization or during polymerization.

Another subject of the present invention is the use of the aqueous dispersions of polymer (I) described above in crosslinking processes.

Thus, the invention relates to a process for crosslinking a latex (II) prepared from a mixture:

of at least one monomer containing ethylenic unsaturation (D), and either of at least one ethylenically unsaturated monomer containing an epoxide function (E), or of at least one polymer containing an epoxide function (EP), or of a mixture of monomers (E) and of polymers (EP), in which the said latex (II) is reacted with an aqueous dispersion of polymer (I) as defined above.

The monomers containing ethylenic unsaturation (D) can be chosen from:

aromatic monomers containing at least one exocyclic ethylenic unsaturation, such as styrene, α-methylstyrene, alkylstyrenes such as methylstyrene, halostyrenes such as chlorostyrene, vinyltoluene, vinylnaphthalene, divinylbenzene, diallyl phthalate, or monomers containing a carboxylic ester function such as acrylic and methacrylic esters in which the alkyl group is $C_1$ to $C_{18}$, optionally substituted copolymerizable β-ketocarboxylic esters, and vinyl esters such as vinyl acetate, vinyl Versatate® or vinyl propionate. Among the acrylic and methacrylic esters whose alkyl group is $C_1$ to $C_{18}$, mention may be made in particular of methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, 2-ethylhexyl acrylate, 2-ethylhexyl methacrylate, cyclohexyl acrylate, cyclohexyl methylacrylate, decyl acrylate, decyl methacrylate, isodecyl acrylate, isodecyl methacrylate, stearyl acrylate or stearyl methacrylate. Preferred examples of this monomer are styrene and alkylstyrenes. Among the β-ketocarboxylic esters which may be mentioned are vinyl acetoacetate, allyl acetoacetate, acetoacetoxyethyl methacrylate and acetoacetoxyethyl acrylate.

In this type of crosslinking process, the presence of an epoxide function in the medium is essential. The monomers (E) can be chosen from glycidyl acrylate, glycidyl methacrylate and allyl glycidyl ether. The polymers containing an epoxide function (EP) can be chosen from bisphenol A diglycidyl ether, diglycidyl adipate, 1,4-diglycidyl butyl ether and derivatives thereof. In the context of the present invention, a latex (II) consisting exclusively of at least one polymer containing an epoxide function (EP) may also be envisaged.

It is preferable for the polymer (I) to be obtained from the polymerization of a mixture of monomer(s) (B) comprising few or no carboxylic acids since these can limit the crosslinking reaction with the latex (II). Thus, according to a preferred embodiment, the crosslinking process takes place in the presence of an aqueous dispersion of polymer (I) obtained from the copolymerization of a mixture of monomers comprising:

N-vinylimidazole as monomer (A), and methyl methacrylate and/or n-butyl acrylate as monomer (B).

A first embodiment consists in crosslinking a latex (II) prepared from a mixture of at least one monomer containing ethylenic unsaturation (D) and of at least one ethylenically unsaturated monomer containing an epoxide function (E).

A second embodiment consists in crosslinking a latex (II) prepared from a mixture of at least one monomer containing ethylenic unsaturation (D) and of at least one polymer containing an epoxide function (EP).

A third embodiment consists in crosslinking a latex (II) prepared from a mixture of at least one monomer containing ethylenic unsaturation (D) and of at least one ethylenically unsaturated monomer containing an epoxide function (E) mixed with at least one polymer containing an epoxide function (EP).

A fourth embodiment consists in crosslinking a latex (II) prepared from at least one ethylenically unsaturated monomer containing an epoxide function (E) and a mixture of monomers containing ethylenic unsaturation (D) comprising at least one aromatic monomer containing an exocyclic ethylenic unsaturation and at least one (meth)acrylic ester.

A fifth embodiment consists in crosslinking a latex (II) prepared from at least one ethylenically unsaturated monomer containing an epoxide function (E) and a mixture of monomers containing ethylenic unsaturation (D) comprising at least one aromatic monomer containing an exocyclic ethylenic unsaturation and at least one β-ketocarboxylic ester.

The crosslinking process according to the invention can lead to dense crosslinked networks. When such networks are desired, the latex (II) is generally prepared from a mixture also comprising at least one ethylenically unsaturated monomer containing a hydroxyl function (F). The monomers (F) can be chosen from 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 4-hydroxybutyl acrylate and 4-hydroxybutyl methacrylate. This monomer is preferably 2-hydroxyethyl acrylate or 2-hydroxyethyl methacrylate.

A sixth embodiment consists in crosslinking a latex (II) prepared from a mixture of monomers containing ethylenic unsaturation (D) comprising at least one aromatic monomer containing an exocyclic ethylenic unsaturation and at least one (meth)acrylic ester, at least one ethylenically unsaturated monomer containing an epoxide function (E) and at least one ethylenically unsaturated monomer containing a hydroxyl function (F).

A seventh embodiment consists in crosslinking a latex (II) prepared from a mixture of monomers containing ethylenic unsaturation (D) comprising at least one aromatic monomer containing an exocyclic ethylenic unsaturation and at least one (meth)acrylic ester, at least one ethylenically unsaturated monomer containing an epoxide function (E) mixed with at least one polymer containing an epoxide function (EP) and at least one ethylenically unsaturated monomer containing a hydroxyl function (F).

An eighth embodiment consists in crosslinking a latex (II) consisting exclusively of polymers containing an epoxide function (EP), for example bisphenol A diglycidyl ether, diglycidyl adipate or 1,4-diglycidyl butyl ether. In this case, the crosslinking process is generally carried out with a dispersion of polymer (I) obtained from the homopolymerization of a mixture consisting exclusively of monomers (A).

The crosslinking process according to the invention can take place in the presence of a compound (G) capable of reacting according to the Michael reaction. The compound (G) can be chosen from resins comprising at least two double bonds conjugated with at least one carbonyl function (C=O), in particular 1,1,1-tris(hydroxymethyl)-propane-tri-acrylate.

The latex (II) and the polymer (I) are generally mixed in proportions such that the epoxide function/nucleophilic function ratio is equimolar.

The crosslinking process can be carried out in the presence of common adjuvants such as thickeners, wetting agents, antifoams, glycols, coalescers, pigments, dispersants and base activators. Depending on the intended application, the amount of adjuvant(s) used may vary. A person skilled in the art knows how to select the appropriate amounts depending on the intended application.

The aqueous dispersions of polymers (I) and latex (II) can crosslink at room temperature or at higher temperature to form thermoset coatings and films, in particular when it is desired to produce coatings such as varnishes and paints.

The aqueous dispersions of polymers (I) and latex (II) preferably crosslink at room temperature to form films and coatings. The expression "room temperature" means a temperature between 15° C. and 30° C. The aqueous dispersions of polymers (I) and latex (II) can also crosslink at lower temperatures to form films and coatings, for example at about 5° C., if coalescers are incorporated.

These coatings can be applied to any type of substrate: wood, metal, concrete, plaster, terracotta, stones, bricks, tiles, plastics, glass, paper, leather and similar materials.

Finally, a subject of the invention is the product containing an aqueous dispersion of polymer (I), and a latex (II) prepared from a mixture of at least one monomer containing ethylenic unsaturation (D), at least one ethylenically unsaturated monomer containing an epoxide function (E) and optionally at least one polymer containing an epoxide function (EP), as a combination product for combined use for the preparation of a coating.

The expression "combined use" means a use of the aqueous dispersion of polymer (I) and of the latex (II) together to obtain a coating; the dispersion of polymer (I) and of the latex (II) possibly being introduced simultaneously or separately.

The examples which follow give a more detailed description of the invention. They are not in any way limiting.

EXAMPLES

Example 1

Synthesis of an Aqueous Dispersion of a Copolymer (I) Containing an Imidazole Function The polymerization is carried out in a 5 litre jacketed reactor equipped with a mechanical stirrer, a condenser and a system for maintaining an inert atmosphere ($N_2$) above the reaction medium.

The following are introduced at room temperature:

1580 g of purified water, 5.165 g of methyl allyl sulphonate, 36 g of sodium lauryl sulphate.

The temperature is brought to 80° C.±10° C. 4.22 g of ammonium peroxodisulphate and 4.33 g of sodium hydrogen carbonate are then added.

A mixture of monomers having the composition below is then introduced over 4 h 30 min:

536 g of methyl methacrylate (B), 546 g of butyl acrylate (B), 60 g of 2-hydroxyethyl methacrylate (B), 60 g of N-vinylimidazole (A).

The following mixture is simultaneously introduced over 5 hours:

4.2 g of ammonium peroxodisulphate, 2.4 g of sodium hydrogen carbonate, 200 g of purified water.

The polymerization pH is about 8.5.

Once the introductions are complete, the mixture is cured for one hour at 80° C.

In order to consume the maximum amount of residual monomers, a redox pair is added to the medium at 70° C.: 3.12 g of tert-butyl peroxybenzoate are introduced and the reactor is then fed for 15 minutes with a reductive solution of 1.9 g of isoascorbic acid dissolved in 10 ml of water.

The temperature is maintained at 70° C. for 45 minutes in order for this redox couple to have maximum efficacy.

The copolymer dispersion obtained is then cooled to room temperature.

This operation gives a copolymer containing an imidazole function, having a solids content of 41%.

The viscocity of this dispersion is 25 mPa·s. The viscosity is measured at 50 rpm using a Brookfield viscometer.

This latex has a pH of 8.1.

Example 2

Synthesis of a Copolymer (I) Containing an Imidazole Function

The ingredients below are successively introduced into a 1 litre reactor equipped with a mechanical stirrer, a condenser, a thermometer and a nitrogen inlet:

930 ml of ultrafiltered and deionized water, 20.02 g (0.28 mol) of acrylamide (B), 1 g (0.01 mol) of N-vinylimidazole (A).

The solution is then acidified with $10^{-1}$ N HCl solution until the pH is about 5.5, after which it is deoxygenated by bubbling nitrogen through for 30 mins.

330 mg of 2,2'-azobis(2-methylpropioamidine) dihydrochloride ($1.2 \times 10^{-3}$ mol) dissolved in a small amount of water are then introduced, after which the reaction mixture is heated at 55–58° C. for about 3 hours.

After cooling, the solution is precipitated in acetone. The copolymer obtained in the form of white filaments is dried under vacuum using a vane pump, ground in a ball mill and dried again.

21 g of copolymer (I) are obtained, i.e. a yield of 88%.

Example 3

Synthesis of a Latex (II) Containing Hydroxyethyl and Epoxide Functions

The ingredients below are introduced, at room temperature, into a 5 litre jacketed reactor equipped with a mechanical stirrer, a condenser and a system for maintaining an inert atmosphere ($N_2$) above the reaction medium:

2130 g of purified water, 8.909 g of Aerosol MA80 surfactant (sodium dihexyl sulphosuccinate), 8.4 g of butyl acrylate (D), 19.5 g of methyl methacrylate (D), and 4.272 g of sodium hydrogen carbonate.

The temperature is brought to 82° C. over approximately 1 hour.

9.36 g of ammonium peroxydisulphate are added at a temperature of 82° C.±1° C. in order to initiate the polymerization reaction.

After waiting for 15 minutes (polymerization at the bottom of the vessel and control of the exothermicity), introduction of the monomers is begun. A mixture is introduced of the following composition:

147 g of styrene (D), 281.6 g of 2-hydroxyethyl methacrylate (F), 40.16 g of glycidyl methacrylate (E), 9.28 g of Aerosol OT 75 surfactant (sodium dioctyl sulphosuccinate), 75.8 g of Shell Epikote 828 epoxy resin-(mean molecular mass =700) polymer (EP), 562.1 g of butyl acrylate (D), 464.6. g of methyl methacrylate (D).

This mixture is added over 3 hours. At the end of the introduction, the temperature is maintained at 82° C. for 1 hour, in order to consume the maximum amount of residual monomers.

The product is finally cooled to room temperature.

This operation gives a latex containing hydroxyethyl and epoxide functions and having a solids content of 44%.

The viscosity of this latex is 47 mPa·s. The viscosity is measured at 50 rpm using a Brookfield viscometer.

This latex has a pH of 6.9

Example 4

Synthesis of a Latex (II) Containing an Epoxide Function

The emulsion polymerization is carried out in a 1.5 litre jacketed reactor equipped with a mechanical stirrer, a condenser and a system for maintaining an inert atmosphere ($N_2$) above the reaction medium.

The following components are introduced into the reactor, at room temperature:

380 g of purified water, 8.92 g of Rhodafac RS610® (ethoxylated phosphatized tridecyl alcohol), 5.5 ml of aqueous 10% NaOH solution (bringing the pH from about 2.0 to 3.9)

The mixture is heated to 80° C. (±1° C.).

When the temperature reaches 80° C. +1° C., the following are added in a single portion:

0.144 g of ammonium peroxodisulphate, 5 g of purified water.

Two solutions are then introduced continuously and in parallel at 80° C.±1° C.

Solution 1 is added over 5 hours. It comprises:

136.5 g of styrene (D), 130.7 g of butyl acrylate (D), 93 g of glycidyl methacrylate (E).

Solution 2 is added over 6 hours. It comprises:

1.47 g of ammonium peroxodisulphate, 1.728 g of sodium hydrogen carbonate, 50 g of purified. water.

At the end of the introduction, the temperature is maintained at 80° C.±1° C. for 1 hour.

Just before cooling, in order to consume the maximum amount of residual monomers, a redox couple is added consisting of:

0.67 g of tert-butyl hydroperoxide, 0.47 g/10 ml $H_2O$ of sodium metabisulphite.

This procedure gives a latex with a solids content of 46%.

Example 5

Synthesis of a Latex (II) Containing β-ketocarboxylic Ester and Epoxide Functions The polymerization is carried out in a 1.5 litre jacketed reactor equipped with a mechanical stirrer, a condenser and a system for maintaining an inert atmosphere ($N_2$) above the reaction medium.

The following components are introduced into the reactor, at room temperature:

2120 g of purified water, 8.92 g of sodium dihexyl sulphosuccinate (Aerosol MA 80®), 8.4 g of butyl acrylate (D), 19.5 g of methyl methacrylate (D)

4.27 g of sodium hydrogen carbonate.

The mixture is heated to 82° C. (±1° C.).

When the temperature reaches 82° C.±1° C., the following are added in a single portion:

9.36 g of ammonium persulphate, 50 g of purified water.

The medium is left to react for 15 minutes.

The following mixture is then introduced over 3 hours at 82° C. ±1° C.:

128 g of styrene (D), 19.7 g of glycidyl methacrylate (E), 156.8 g of acetoacetoxyethyl methacrylate (β-ketocarboxylic ester), 12.8. g of sodium dioctyl sulphosuccinate (Aerosol OT-75®), 525.3 g of butyl acrylate (D), 446.4 g of methyl methacrylate (D).

The products Aerosol OT-75® and Aerosol MA 80® are sold by Cytec.

The reaction medium is then maintained at 82° C.±1° C. for 1 hour, before cooling.

This procedure gives a latex containing β-keto ester and epoxide functions and having a solids content of 42%.

Example 6

Test of Swelling and of Setting

Two crosslinkable systems are prepared.

Sample 1, according to the prior art, is a mixture of the latex of Example 3 and 1,4-diazabicyclo [2.2.2] octane (referred to as DABCO hereinbelow) which is a nucleophilic compound.

Sample 2, according to the invention, is a mixture of the dispersion of copolymer (I) grafted with an N-vinylimidazole, prepared according to Example 1, and of the latex (II) prepared according to Example 3.

For the two samples, the mixtures are prepared in an epoxide function/nucleophilic function equimolar ratio.

These samples are used to coat an earthenware tile.

The degree of swelling is measured on the film obtained, according to the following protocol. A piece of the film obtained is weighed (mass M1) and then immersed in methyl ethyl ketone (MEK) for 24 hours. After immersion for 24 hours, the piece of film is removed from the solvent, immediately weighed (mass M2) and then dried in an oven. After drying for 1 hour at 105° C., the film is weighed (mass M3). The degree of swelling is given by the formula:

$$\frac{(M2 - M3) \times 100}{M3}$$

The results are given in Table I.

TABLE I

| Sample | Degree of swelling (%) after drying for 14 days at 23° C. under 55% relative humidity | Setting time of the mixture |
|---|---|---|
| 1 Comparative | 640 | 4 hours |
| 2 Invention | 610 | 7 days |

It is found that sample 2 according to the invention has a longer pot life than sample 1 of the prior art, since the setting time of sample 2 is markedly longer than that of sample 1 of the prior art.

The degree of swelling reflects the reactivity of the copolymer (I) with the latex (II). Sample 2 is more reactive than sample 1 since it gives a strong film which swells less in the presence of solvent. It should be noted that in the absence of copolymer (I), the latex (II) dissolves in methyl ethyl ketone (MEK), which proves that the latex (II) cannot crosslink unless the copolymer (I) is added.

Example 7
Swelling Test

In order to confirm the efficacy of the various crosslinking systems described in the invention, three different crosslinkable systems using different types of copolymer (I) and of latex (II) are prepared and compared:

Sample 3 is a mixture of the copolymer (I) grafted with an imidazole, prepared according to Example 2 (which is not in the form of an aqueous dispersion), and of the latex prepared according to Example 3.

Sample 4 is a mixture of the aqueous dispersion of the copolymer (I) grafted with an imidazole, prepared according to Example 1, and of the latex prepared according to Example 4.

Sample 5 is a mixture of the aqueous dispersion of the copolymer (I) grafted with an imidazole, prepared according to Example 1, and of the latex (II) prepared according to Example 5; the crosslinking takes place in the presence of 1,1,1-tris(hydroxymethyl)-propane-tri-acrylate.

All the samples are prepared using identical molar amounts of each of the reactive functions, namely the epoxide, the imidazole and the double bonds of the 1,1,1-tris(hydroxymethyl)-propane-tri-acrylate for sample 5.

As in Example 6, these samples are used to coat an earthenware tile. The degree of swelling is measured on the film obtained, according to the protocol described in Example 6.

The results are given in Table II.

TABLE II

| Sample | Degree of swelling in MEK (%) Drying for 21 days at 23° C. and 55% relative humidity |
|---|---|
| 3 Comparative | 1320 |
| 4 Invention | 865 |
| 5 Invention | 613 |

It is found that sample 3 in which a copolymer (I) not in the form of an aqueous dispersion is used gives very poor crosslinking, unlike samples 4 and 5 according to the invention.

Example 8
Properties of the Varnishes

A coating composition is prepared by mixing:
40.17 g of latex (II) prepared according to Example 3, having a solids content of 38.8%, 25.06 g of copolymer (I) prepared according to Example 1, having a solids content of 43.7%, 0.14 g of Bevaloid® 6681 antifoam, 5.32 g of a Rheoe® 2000 thickener solution with a solids content of 5%, neutralized to pH = 6.9 with 10% sodium hydroxide (NaOH).

The coating composition is applied to QD36I steel plates to a dry thickness of 35 µm. The films are dried for 21 days at 23° C. under 55% relative humidity.

The hardness and solvent-resistance properties of the varnish are measured.

The solvent resistance is evaluated according to the following protocol: the plate is rubbed with a pad of cotton wool soaked with methyl ethyl ketone (MEK); the number of to-and-fro rubbing actions of the pad which are required to remove the varnish completely from at least one point on the plate is counted (rub test).

The results are collated in Table III.

TABLE III

| MFFT (minimum film-forming temperature) | 15° C. |
|---|---|
| Rub test | >200 to-and-fro rubbing actions |

The chemical resistance of the coating obtained using the composition according to the invention is also evaluated. The chemical resistance is evaluated according to the test which consists in applying 2 ml of test product to the coating and then placing a watch glass over it to prevent evaporation of the liquid. The liquid is left in contact with the coating for 1 or 2 hours depending on the test product After 2 hours, the liquid is removed and the visual appearance of the film is noted:

0=poor

5=good (no mark left on the varnish by the liquid).

The results are collated in Table IV.

TABLE IV

| Test product | Contact time | Appearance of the film |
|---|---|---|
| 10% $H_2SO_4$ | 1 hour | 5 |
| 20% $NH_4OH$ | 1 hour | 5 |
| Water | 2 hours | 5 |

Example 9
Pot Life—Rub Test

The coating composition of Example 8 is applied to QD 36 I steel plates at different times t after manufacture of the said composition. The dry thickness of the coatings is 35 µm.

The solvent resistance of the coatings obtained is evaluated according to the protocol described in Example 8 after drying the coatings for 21 days.

Table V collates the results obtained.

TABLE V

| Time between preparing the composition and applying it | t = 30 min | t = 4 h | t = 6 h | t = 8 h | t = 24 h |
|---|---|---|---|---|---|
| Rub test | >200 | >200 | >200 | >200 | >180 |

It is found that the mixture of aqueous dispersion of copolymer (I) and of latex (II) keeps its properties for a long time (t>8 hours), virtually up to 24 hours.

The pot life is improved.

What is claimed is:

1. A process for crosslinking a latex (II) prepared from a mixture of:
  at least one monomer containing ethylenic unsaturation (D), and
  at least one ethylenically unsaturated monomer containing an epoxide function (E), wherein said latex (II) is reacted with an aqueous dispersion of polymer (I) made by the process of:
    a) carrying out an emulsion polymerization in water of a mixture of monomers comprising:
  at least one unsaturated heterocyclic monomer (A) comprising at least one nucleophilic hetero atom, containing at least one exocyclic ethylenic unsaturation, and whose heterocycle comprises an ethylenic unsaturation, and
  optionally:
    at least one ethylenically unsaturated monomer (B) containing a (meth)acrylamide, carboxylic acid, carboxylic acid salt, carboxylic ester, organosulphuric acid, organosulphuric acid salt, sulphonic acid, sulphonic acid salt, phosphonic acid, phosphonic acid salt, or vinyl ester function, or an aromatic monomer containing at least one exocyclic ethylenic unsaturation.

2. A process according to claim 1, wherein the monomers containing ethylenic unsaturation (D) are:
  aromatic monomers containing at least one exocyclic ethylenic unsaturation, or
  monomers containing a carboxylic ester function.

3. A process according to claim 2, wherein the monomers containing ethylenic unsaturation (D) are:
  styrene, β-methylstyrene, methylstyrene, chlorostyrene, vinyltoluene, vinylnaphthalene, divinylbenzene, diallyl phthalate, or
  acrylic and methacrylic esters with a $C_1$ to $C_{18}$ alkyl group.

4. A process according to claim 1, wherein the monomers containing an epoxide function (E) are glycidyl acrylate, glycidyl methacrylate, or allyl glycidyl ether.

5. A process according to claim 1, wherein the monomers containing an epoxide function (E) are bisphenol A diglycidyl ether, diglycidyl adipate, or 1,4-diglycidyl butyl ether.

6. A process according to claim 1, wherein the latex (II) is prepared from at least one ethylenically unsaturated monomer containing an epoxide function (E) and a mixture of monomers containing ethylenic unsaturation (D) comprising at least one aromatic monomer containing an exocyclic ethylenic unsaturation and at least one (meth)acrylic ester.

7. A process according to claim 1, wherein the latex (II) is prepared from at least one ethylenically unsaturated monomer containing an epoxide function (E) and a mixture of monomers containing ethylenic unsaturation (D) comprising at least one aromatic monomer containing an exocyclic ethylenic unsaturation and at least one β-ketocarboxylic ester.

8. A process according to claim 1, wherein the latex (II) is prepared from a mixture further comprising at least one ethylenically unsaturated monomer containing a hydroxyl function (F).

9. A process according to claim 8, wherein the monomer containing a hydroxyl function (F) is 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 4-hydroxybutyl acrylate, or 4-hydroxybutyl methacrylate.

10. A process according to claim 1, wherein the latex (II) is reacted with a dispersion of polymer (I) obtained from the homopolymerization of a mixture consisting of monomers (A).

11. A process according to claim 1, wherein the aqueous dispersion of polymer (I) is obtained from the copolymerization of a mixture of N-vinylimidazole as monomer (A), methyl methacrylate or n-butyl acrylate as monomer (B).

12. A process according to claim 1, wherein the crosslinking of the latex takes place further in the presence of a compound (G) which can react according to the Michael reaction.

13. A process according to claim 12, wherein the compound (G) is a resin comprising at least two double bonds conjugated with at least one carbonyl function (C=O).

14. A process according to claim 13, wherein the compound (G) is 1,1,1-tris(hydroxymethyl)-propane-tri-acrylate.

15. A process according to claim 1, wherein the aqueous dispersion of polymer (I) and the latex (II) crosslink at room temperature to form films and coatings.

16. A process according to claim 1, wherein the unsaturated heterocyclic monomer (A) comprises at least one nucleophilic hetero atom selected from the group consisting of nitrogen, phosphorus, arsenic, antimony and bismuth.

17. A process according to claim 16, wherein the unsaturated heterocyclic monomer (A) comprises two nitrogen atoms.

18. A process according to claim 1, wherein at least one of the nucleophilic hetero atoms or at least one of the carbon atoms of the heterocycle is substituted with a carbon-based chain containing at least two carbon atoms and at least one ethylenic unsaturation.

19. A process according to claim 18, wherein the carbon-based chain is vinyl, allyl, propenyl, butenyl, butadienyl, acrylate, or methacrylate.

20. A process according to claim 1, wherein the monomer (A) is an imidazole, imidazoline, amidine or guanidine compound.

21. A process according to claim 20, wherein the monomer (A) is N-vinylimidazole.

22. A process according to claim 1, wherein the content of monomer(s) (A) is between 1% and 100% by weight, relative to the total weight of the polymer (I).

23. A process according to claim 22, wherein the content of monomer(s) (A) is between 1% and 20% by weight.

24. A process according to claim 23, wherein the content of monomer(s) (A) is between 1% and 6% by weight.

25. A process according to claim 1, wherein the polymer (I) is a homopolymer made by homopolymerizing a mixture consisting of identical monomers (A).

26. A process according to claim 1, wherein the ethylenically unsaturated monomer (B) is (meth)acrylic acid, dicarboxylic acid, hemiester of dicarboxylic acid, carboxylic ester of acrylic acid having an alkyl group containing from 1 to 20 carbon atoms, organosulphuric acid, alkali metal salt of organosulphuric acid, alkaline-earth metal salt of organosulphuric acid, sulphonic acid, alkali metal salt of sulphonic acid, alkaline-earth metal salt of sulphonic acid, phosphonic acid, alkali metal salt of phosphonic acid, alkaline-earth metal salt of phosphonic acid, vinyl ester in which the part comprising the ester function contains 1 to 7 carbon atoms, (meth)acrylamide in which the alkyl group contains from 1 to 10 carbon atoms, or an aromatic monomer containing at least one exocyclic ethylenic unsaturation and having 8 to 18 carbon atoms.

27. A process according to claim 1, wherein the content of monomer(s) (B) is between 1% and 99% by weight, relative to the total weight of the polymer (I).

28. A process according to claim 27, wherein the content of monomer(s) (B) is between 80% and 99% by weight.

29. A process according to claim 28, wherein the content of monomer(s) (B) is between 94% and 99%.

30. A process according to claim 1, wherein the mixture of monomers further comprises at least one hydroxycarboxylic ester (C) which is an acrylic or methacrylic esters in which the hydroxyalkyl group contains from 2 to 10 carbon atoms.

31. A process according to claim 30, wherein the content of hydroxycarboxylic ester monomer (C) is between 1% and 40% by weight relative to the total weight of the copolymer (I).

32. A process according to claim 1, wherein the polymerization is carried out at a pH of at least 7.

* * * * *